(12) United States Patent
Wray

(10) Patent No.: US 8,392,587 B2
(45) Date of Patent: Mar. 5, 2013

(54) FEDERATED MANAGEMENT FRAMEWORK FOR CREDENTIAL DATA

(75) Inventor: John C. Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 11/426,954

(22) Filed: Jun. 28, 2006

(65) Prior Publication Data

US 2008/0022379 A1 Jan. 24, 2008

(51) Int. Cl.
G06F 15/16 (2006.01)
G06F 7/04 (2006.01)
G06F 17/50 (2006.01)
G06Q 10/00 (2006.01)

(52) U.S. Cl. ........ 709/229; 709/228; 726/5; 726/8; 705/28; 705/29

(58) Field of Classification Search .......... 709/228, 709/229; 705/28, 29; 726/5, 8
See application file for complete search history.

(56) References Cited

U.S. PATENT DOCUMENTS

| | | | |
|---|---|---|---|
| 6,260,142 B1 * | 7/2001 | Thakkar et al. | 713/158 |
| 7,376,945 B1 * | 5/2008 | Kakumani et al. | 717/171 |
| 7,392,536 B2 * | 6/2008 | Jamieson et al. | 726/8 |
| 7,552,470 B2 * | 6/2009 | Dominic | 726/8 |
| 2002/0184507 A1 | 12/2002 | Makower et al. | |
| 2003/0229812 A1 | 12/2003 | Buchholz | |
| 2004/0128546 A1 | 7/2004 | Blakley, III et al. | |
| 2005/0071667 A1 | 3/2005 | Dankovich et al. | |
| 2005/0114701 A1 | 5/2005 | Atkins et al. | |
| 2005/0154913 A1 | 7/2005 | Barriga et al. | |
| 2005/0171872 A1 * | 8/2005 | Burch et al. | 705/29 |
| 2005/0223412 A1 | 10/2005 | Nadalin et al. | |
| 2005/0289644 A1 * | 12/2005 | Wray | 726/5 |
| 2006/0230437 A1 * | 10/2006 | Alexander Boyer et al. | 726/4 |

FOREIGN PATENT DOCUMENTS

WO 2004004273 A1 1/2004

\* cited by examiner

*Primary Examiner* — Peter Shaw

(74) *Attorney, Agent, or Firm* — Edward Choi; Hoffman Warnick LLC

(57) ABSTRACT

Federated management framework for credential data. The framework permits credential-using applications to provide user interface panels and associated semantics to manage the credentials that are relevant to each application. This framework is suitable for use in a multi-application environment where credentials are shared among each the applications. With this framework, each management user interface associated with one of the applications can have the credentials appear in the interface. Furthermore, the framework can detect when one application's management user interface attempts a modification to a credential that will affect another application that has an interest that credential.

16 Claims, 4 Drawing Sheets

FEDERATED MANAGEMENT FRAMEWORK FOR CREDENTIAL DATA

TECHNICAL FIELD

This disclosure generally relates to management of a central collection of shared data that are used by multiple applications, and more specifically to a federated management framework that facilitates application level credential management in a controlled manner.

BACKGROUND

Electronic credentials are data objects having associated properties that generally are used in networked computer systems for identification and/or authorization purposes. Passwords, keys, certificates and usernames, are just a few examples of credentials. In an application deployment platform where there are a multiple of applications that run on a client system, it is typical for the applications to share credentials. Generally, a platform-provided unified mechanism such as a credential store is used to store and share the credentials between the multiple applications.

Often times a user will need to manage these credentials, performing functions such as deleting expired or unwanted credentials, adding new credentials, or adjusting the visibility or other properties of the credentials. One approach to managing credentials includes using a single generic type tool as a part of the platform that does not have knowledge of the applications. A single generic type tool typically does not work well because it is unable to generate a user friendly user interface since it cannot interpret the semantics associated with the application-specific credential properties. Furthermore, this tool cannot enforce application-defined constraints because it does not have knowledge of the applications. For example, a messaging application might require that at most one private key is labeled as the default messaging signature key, but if this labeling was done using an application-defined property, the platform would neither understand it purpose nor its constraints. Another problem associated with the single generic type tool is that in the scenario where multiple applications share credentials, the tool does not allow the applications to create their own properties that are associated with the credentials. Even if the tool had this capability it would not be able to create a user friendly user interface to manage those application defined properties.

One way of overcoming the problems associated with using a single generic tool in the management of credentials is by using application-specific tools to manage credentials that belong to each application. This approach would permit application-specific semantics to be exposed and constraints enforced, however, it would result in a number of different and independent credential management tools. Further, problems would arise for credentials that are shared between applications. In particular the shared credentials would be managed by multiple tools making it very confusing for the user, especially in instances where different overlapping subsets of properties are managed by different tools.

Therefore, there is a need for a methodology that can better facilitate management of credentials that are shared between a multiple of applications. Instead of directly managing credentials, an approach that manages the associations between the credentials and the applications that want to use them would afford a more controlled methodology that is not currently available, especially in scenarios where multiple applications share credentials. Such an approach would not manipulate the underlying credentials but rather the associations between the credentials and the applications that are represented by labels or tags attached to the credentials. Management would then be directed towards items such as adding or deleting labels or changing values associated with the labels, rather than manipulating the underlying credentials. If there was interest in deleting a credential then it would be analogous to deleting all of the labels attached to the credential.

SUMMARY

In one embodiment, there is a method for using a framework within a computer system to manage credentials associated with a plurality of applications. In this embodiment, a request to modify a credential is received. Then it is determined which of the plurality of applications may have an interest in the credential if modified. Each of the plurality of applications that are interested in the request for modification is notified. Each of the interested plurality of applications is enabled to issue a control action relating to the modification of the credential.

In another embodiment, there is a management framework for use in a computer system that manages credentials associated with a plurality of applications. The framework comprises an input component configured to receive a credential modification request from the plurality of applications. There is a list containing each of the plurality of applications and the credentials that each application has an interest in. A credential coordinator is configured to receive the credential modification request and determine from the list which of the plurality of applications may have an interest in the credential if modified. The credential coordinator comprises notification logic configured to notify each of the interested plurality of applications of the request for modification and enabling logic configured to permit each of the interested plurality of applications to issue a control action relating to the modification of the credential.

In a third embodiment, there is a computer readable medium and computer data signal medium both containing computer instructions for causing a framework within a computer system to manage credentials associated with a plurality of applications. In this embodiment, the computer instructions include receiving a request to modify a credential; determining which of the plurality of applications may have an interest in the credential if modified; notifying each of the interested plurality of applications of the request for modification; and enabling each of the interested plurality of applications to issue a control action relating to the modification of the credential.

In a fourth embodiment, there is a method for deploying a management framework for use in a computer system that manages credentials associated with a plurality of applications. In this embodiment, a computer infrastructure is provided and is operable to receive a request to modify a credential; determine which of the plurality of applications may have an interest in the credential if modified; notify each of the interested plurality of applications of the request for modification; and enable each of the interested plurality of applications to issue a control action relating to the modification of the credential.

Therefore, this disclosure provides a method, system, program product, and method for deploying an application for using a framework within a computer system to manage credentials associated with a plurality of applications.

BRIEF DESCRIPTION OF THE DRAWINGS

FIG. 1 shows a high-level component architecture diagram of a federated data management framework that manages credentials associated with a plurality of applications;

DETAILED DESCRIPTION

Figure 1:
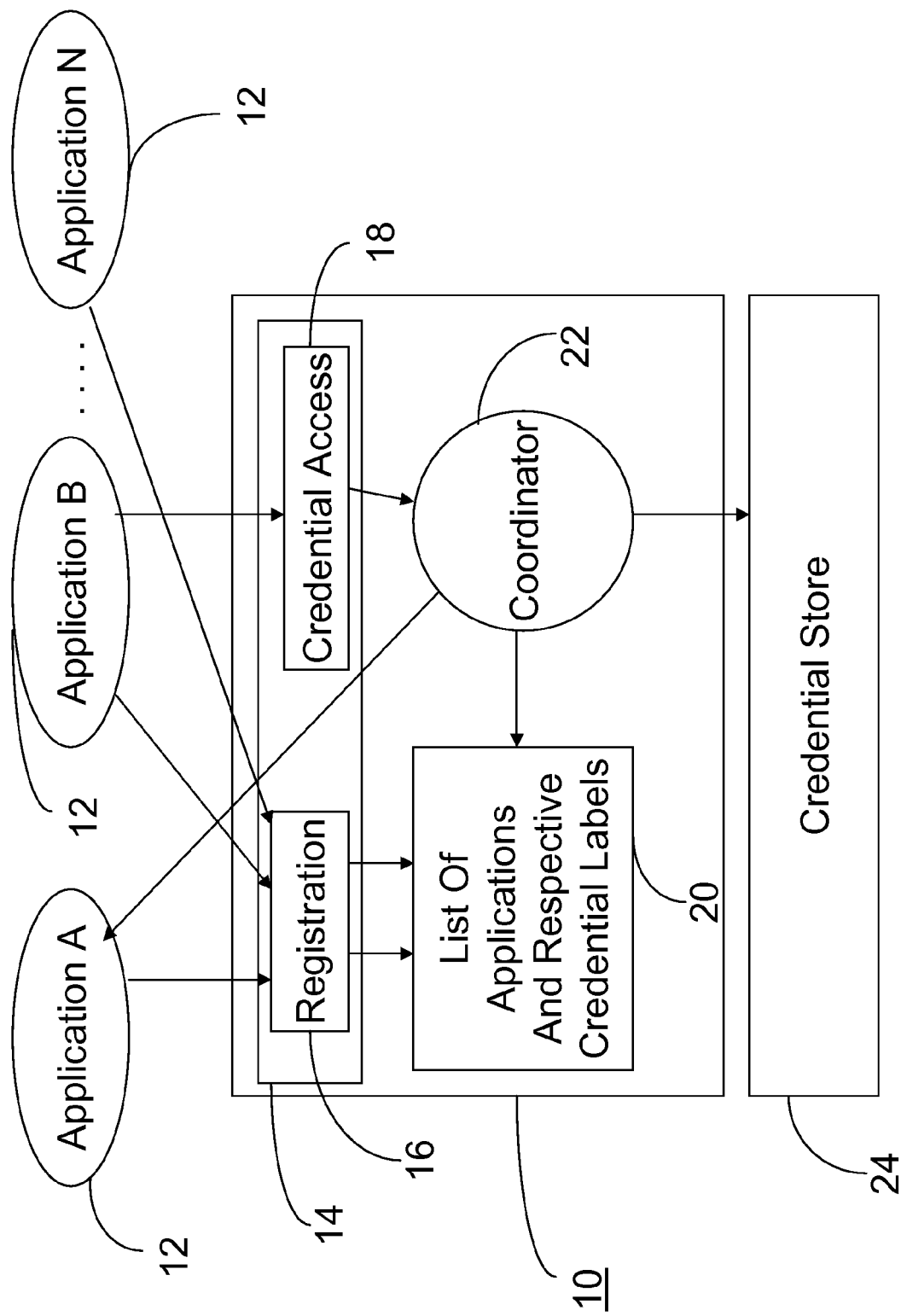

FIG. 1 shows a high-level component architecture diagram of a federated data management framework 10 that manages objects with associated properties that are used by a plurality of applications 12. In the description that follows the federated data management framework 10 is used to manage credentials, but one of ordinary skill in the art will recognize that the principles of this disclosure are suitable for any scenario that provide federated management based on object properties. The plurality of applications 12 includes any computer software that employs the capabilities of a computer directly to a task that a user wishes to perform. This would include single end-user applications and lower level functional components shared by several end-user applications. An illustrative, but non-limiting list of applications available for use with the federated data management framework 10 include electronic mail (email), instant messaging, document management, word processing, spreadsheets, games, electronic commerce applications, and shared Secure/Multipurpose Internet Mail Extensions (S/MIME) layers.

The federated data management framework 10 as shown in FIG. 1 comprises an input component 14 configured to receive credential modification requests from the plurality of applications 12. A credential modification comprises any modification of the credential itself or a modification of the labels or properties attached to the credential. An illustrative, but non-limiting list of credential modifications includes changing a credential, deleting a credential, adding a credential label or tag, removing a credential label, and changing a value associated with a credential tag. The input component 14 comprises registration logic 16 configured to permit each of the plurality of applications 12 to register an interest in a credential. As used herein, an interest in a credential can either be a specific credential or any credential with a particular property or label attached to it. The input component 14 also comprises credential access logic 18 configured to permit each of the plurality of applications 12 to propose credential modifications.

The federated data management framework 10 further comprises a list 20 containing each of the plurality of applications 12 and their respective credentials. The list 20 generally contains each of the plurality of applications 12 and the credential labels/properties that each application owns and has an interest in. An application is considered to own a credential if it has exclusive control over it. When an application owns a credential then it has the right to forbid or veto any attempt by another application to modify the credential. An application is considered to have an interest in a credential if it has a concern on how the credential is managed and used. In this case, applications with an interest in a specific credential have to be told when other applications wants to make modifications to the credential. Besides each of the credentials that an application owns or has an interest are the labels or tags associated with the credentials. The labels or tags are keywords or descriptive terms used as a means of classification making it easier for finding. For example, an email application could use a label to represent a user's default signing key, so when one would want to find the key in the future, they could search for credentials with that label. Although the records of the applications and their respective credentials and labels takes the form of a list in FIG. 1, other forms of repositories for collecting information can be used such as a file, spreadsheet, database, and repository.

A credential coordinator 22 configured to receive credential modification requests from the credential access logic 18, determines from the list 20 which of the plurality of applications 12 may have an interest in any credential modification request. In particular, the credential coordinator 22 utilizes query logic configured to query the list 20 to find out which applications have an interest in the credential. The credential coordinator 22 comprises notification logic configured to notify each of the interested plurality of applications 12 of the modification request. The credential coordinator further comprises enabling logic configured to permit each of the interested plurality of applications to issue a control action relating to the modification of the credential. An illustrative, but non-limiting, list of possible examples of control actions includes approving the proposed modification, or vetoing the modification or taking a recovery action. An example of possible recovery action would be to archive the credential that the application wants to modify and create a new credential that contains the archived credential. Another possible control action that could be taken is to have the application that has an interest in the modification of the credential generate a user interface panel warning to the user that this modification operation is going to affect another application and ask whether the user wants to continue with the modification.

The credential coordinator 22 further comprises logic configured to forward approved modifications to a credential store 24. The credential store 24 is a central platform mechanism for securely storing and sharing credentials and their respective labels between the plurality of applications 12. In particular, the credential store 24 manages the storing and sharing of the credentials by being impervious to application-specific semantics and constraints. The credential store 24 only sees the credentials and labels as opaque items, not knowing their meaning or significance. US Patent Application Publication Number 20050289644 entitled Shared Credential Store, provides a more detailed description of a credential store that could be used by the framework shown in FIG. 1.

The federated data management framework 10 as shown in FIG. 1 acts generally as an application programming interface for the plurality of applications to call when requesting a credential modification. The framework then does the checking for other applications that may have an interest in the modification of the credential and eventually passes the credential modification to the credential store after receiving permission. The configuration shown in FIG. 1 is illustrative of only one exemplary embodiment and one of ordinary skill in the art will realize that the framework can take the form of other configurations. For example, instead of having the framework 10 disposed between the plurality of applications 12 and the credential store 24, the framework could cooperate actively with the applications. In this configuration, the applications 12 would tell the framework 10 of its desire to perform credential modifications and wait for permission from the framework before performing the modifications.

Figure 2:
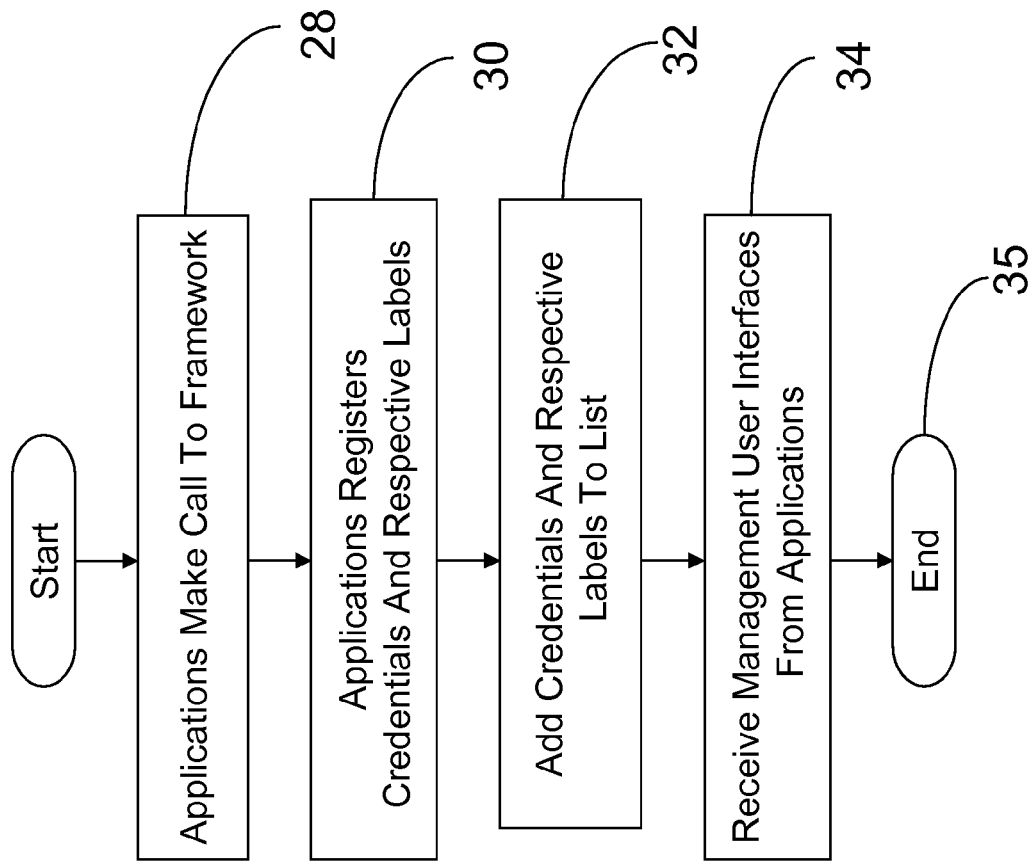
FIG. 2 is a flowchart describing some of the processing functions associated with registering credentials with the federated data management framework shown in FIG. 1.

FIG. 2 is a flowchart 26 describing some of the processing functions associated with registering credentials with the federated data management framework 10 shown in FIG. 1. When an application starts up it will make a call to the framework at 28 and register itself, providing a list of the credentials and associated labels that it owns, as well as the ones that it has an interest in at 30. If the registration logic determines that more than one application claims to own a particular credential or label, then the logic will indicate a configuration error. The registration logic then adds the credential information to the list at 32. In addition, the registration logic will receive management user interfaces from the applications at 34. Management user interfaces are user interfaces that each application provides to the framework to permit application-specific management of credentials. The user interface would then allow the user to manipulate those credential properties that are meaningful to the individual application. As an example, an email application might offer a user the ability to select individual credentials as the defaults to use for signing outgoing mail, and for including in outgoing mail labeled for recipients to use for encrypting replies. The email application would then provide a simple user interface panel that can show a list of all credentials suitable for encrypting or signing mail, indicate which credentials are currently selected as default signing and encrypting credential, and allows the user to change that selection. The user interface panel or management user interface of the email application would be integrated in the framework along with other user interface panels provided by the applications.

Figure 3:
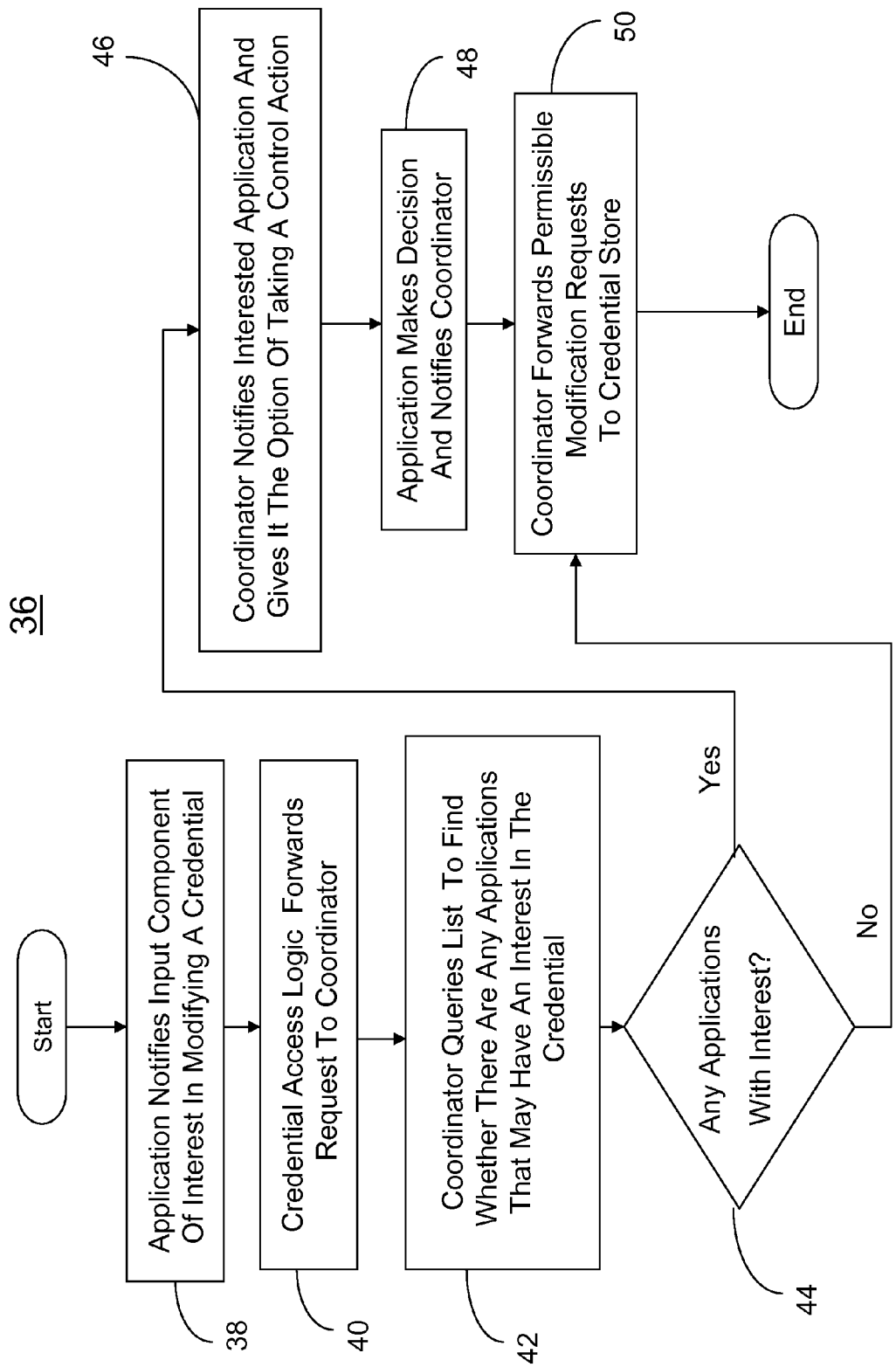
FIG. 3 is a flowchart describing some of the processing functions associated with modifying a credential with the federated data management framework shown in FIG. 1.

FIG. 3 is a flowchart 36 describing some of the processing functions associated with modifying a credential with the federated data management framework 10 shown in FIG. 1. At 38, an application that is interested in making a credential modification makes a request to the input component. The credential access logic then forwards the request to the coordinator at 40. The coordinator then queries the list at 42 to find whether there are any other applications that may have an interest in the modification of the credential. In particular, the coordinator searches the credential labels in the list to find all applications that have an interest in that particular credential. That is, the coordinator determines the labels that would be altered by the proposed credential modification, and searches the list for applications that have registered an interest in those labels. A label is considered to be altered by a modification if the modification directly modifies the label (i.e. removes or creates the label), modifies a value associated with the label, or if the label is presently attached to the credential and the modification would cause the credential to be deleted or otherwise changed.

If the coordinator determines that application does not have the declared rights to manage the credential, then the coordinator will abort the modification with an error. If it is determined at 44 that there are no other applications that have an interest in that particular credential, then the application is permitted to make the modification and thus the coordinator passes the modification request to the credential store at 50. On the other hand, if it is determined at 44 that there are other applications that have an interest in the proposed credential modification, the coordinator informs the interested applications at 46 through their management user interfaces and gives them the option of using the interfaces to make a control action at 48. As mentioned above, the control action comprises approving the proposed modification or vetoing the modification, or taking a recovery action, or generating user interface panel warning the user that the modification operation is going to affect another application. The coordinator then forwards permissible credential modifications to the credential store at 50.

In an exemplary embodiment, many of the processing operations described in FIG. 3 are implemented using the management user interfaces associated with the applications and the user interface that would be associated with the federated management framework 10. In particular, the management user interfaces provided by the applications would be where a user could view and/or attempt to modify the credentials associated with that application. The user interface associated with the federated management framework 10 would provide generic views that list credentials that have properties that no application has declared an interest in (if any such properties exist), as well as any properties that are understood by the underlying credential store or platform. For example, Secure Socket Layer (SSL) would probably be considered a platform-provided service, which any of the deployed applications could make use of. The tags that label certificates and keys as being used by SSL might be managed via the generic platform-provided panel. An alternative would be to treat SSL as if it were an application (albeit an application that ships with and is inextricably bound to the platform), in which case the platform would automatically register an SSL credential management panel with the framework.

An example of how the federated data management framework 10 would handle a proposed modification to a certificate credential that is shared by an instant messaging application and email application is now provided. One reason for making a modification to a certificate credential in an instant messaging application is to note a change in organizational affiliation. In such a situation, the new certificate would have an accompanying key. In this example, the federated data management framework 10 would first be notified that the user wants to replace the instant messaging certificate. Then the federated data management framework 10 would check the list to see what other applications would have an interest in the particular credential that is representative of the certificate. The federated data management framework 10 would find that the email application has an interest in the certificate credential and then would ask the framework whether it was okay to replace the credential. The email application would then examine the candidate replacement credential and determine that it is a different key. Most likely, the email application would not like to make the change because it could no longer decrypt any mail that was previously received. Given the options available, the email application would then either veto the proposed credential modification or take a recovery action like archiving the original certificate credential that the instant messaging application wants to modify and create a new credential that contains the archived credential. This way, the email application can continue to decrypt previously received email messages.

Figure 4:
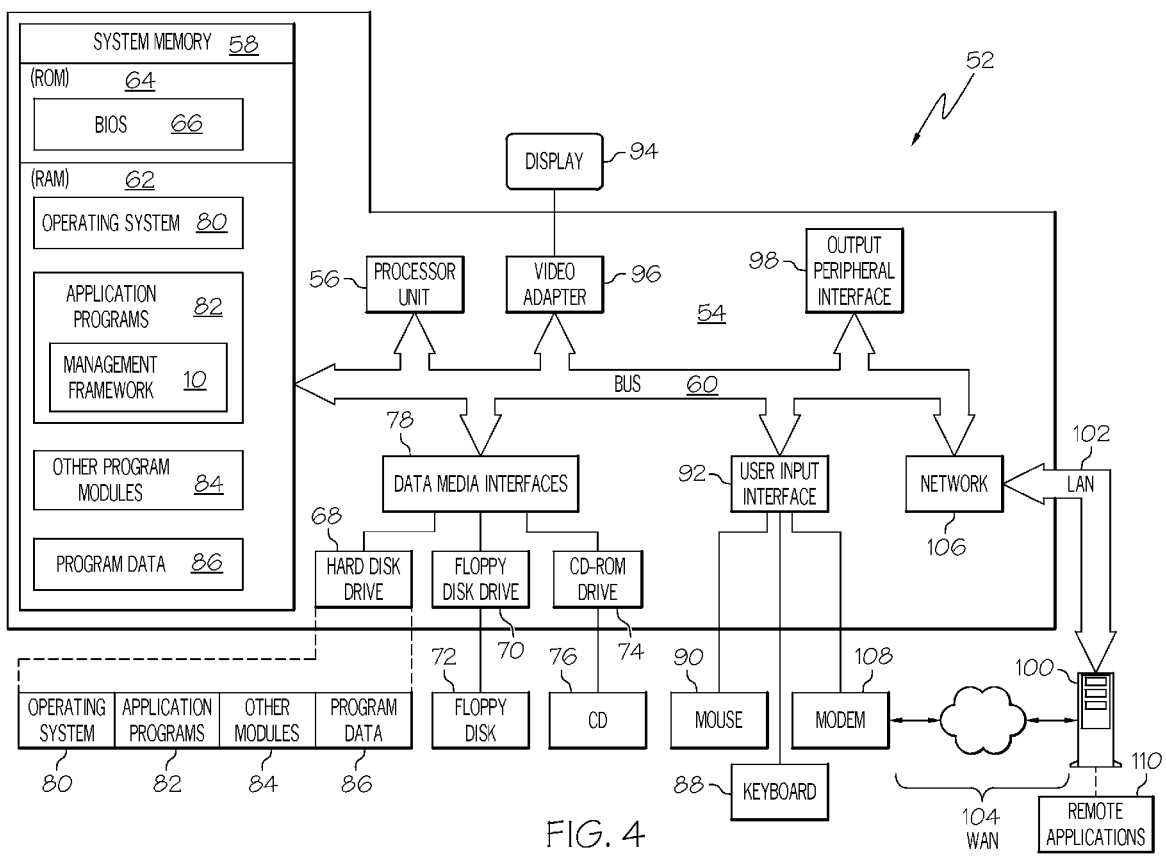
FIG. 4 shows a schematic of an exemplary computing environment in which the federated data management framework shown in FIG. 1 may operate.

FIG. 4 shows a schematic of an exemplary computing environment 52 in which the federated data management framework shown in FIG. 1 may operate. The exemplary computing environment 52 is only one example of a suitable computing environment and is not intended to suggest any limitation as to the scope of use or functionality of the federated data management framework. Neither should the computing environment 52 be interpreted as having any dependency or requirement relating to any one or combination of components illustrated in FIG. 4.

In the computing environment 52 there is a computer 54 which is operational with numerous other general purpose or special purpose computing system environments or configurations. Examples of well known computing systems, environments, and/or configurations that may be suitable for use with an exemplary computer 54 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 54 may be described in the general context of computer-executable instructions, such as program modules, being executed by a computer. Generally, program modules include routines, programs, objects, components, logic, data structures, and so on, that performs particular tasks or implements particular abstract data types. The exemplary computer 54 may be practiced in distributed computing environments where tasks are performed by remote processing devices that are linked through a communications network. In a distributed computing environment, program modules may be located in both local and remote computer storage media including memory storage devices.

As shown in FIG. 4, the computer 54 in the computing environment 52 is shown in the form of a general-purpose computing device. The components of computer 54 may include, but are not limited to, one or more processors or processing units 56, a system memory 58, and a bus 60 that couples various system components including the system memory 58 to the processor 56.

Bus 60 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 54 typically includes a variety of computer readable media. Such media may be any available media that is accessible by computer 54, and it includes both volatile and non-volatile media, removable and non-removable media.

In FIG. 4, the system memory 58 includes computer readable media in the form of volatile memory, such as random access memory (RAM) 62, and/or non-volatile memory, such as read only memory (ROM) 64. A basic input/output system (BIOS) 66 containing the basic routines that help to transfer information between elements within computer 54, such as during start-up, is stored in ROM 64. RAM 62 typically contains data and/or program modules that are immediately accessible to and/or presently operated on by processor 56.

Computer 54 may further include other removable/non-removable, volatile/non-volatile computer storage media. By way of example only, FIG. 4 illustrates a hard disk drive 68 for reading from and writing to a non-removable, non-volatile magnetic media (not shown and typically called a "hard drive"), a magnetic disk drive 70 for reading from and writing to a removable, non-volatile magnetic disk 72 (e.g., a "floppy disk"), and an optical disk drive 74 for reading from or writing to a removable, non-volatile optical disk 76 such as a CD-ROM, DVD-ROM or other optical media. The hard disk drive 68, magnetic disk drive 70, and optical disk drive 74 are each connected to bus 60 by one or more data media interfaces 78.

The drives and their associated computer-readable media provide nonvolatile storage of computer readable instructions, data structures, program modules, and other data for computer 54. Although the exemplary environment described herein employs a hard disk 68, a removable magnetic disk 72 and a removable optical disk 78, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 68, magnetic disk 72, optical disk 78, ROM 64, or RAM 62, including, by way of example, and not limitation, an operating system 80, one or more application programs 82 (e.g., federated data management framework 10), other program modules 84, and program data 86.

Each of the operating system 80, one or more application programs 82 other program modules 86, and program data 86 or some combination thereof, may include an implementation of the federated data management framework 10 of FIG. 1. Specifically, each may include an implementation of the federated data management framework 10 which: (a) permits applications to register credentials and associated labels; (b) adds the credential information to the list; (c) receives credential modification requests from applications; (d) queries the list to find whether there are any other applications that may have an interest in the modification of the credential; (e) allows interested applications to take a control action (approve, veto, display user interface panel warning, take recovery action); and, (f) forwards permissible credential modifications to the credential store.

A user may enter commands and information into computer 54 through optional input devices such as a keyboard 88 and a pointing device 90 (such as a "mouse"). Other input devices (not shown) may include a microphone, joystick, game pad, satellite dish, serial port, scanner, camera, or the like. These and other input devices are connected to the processing unit 56 through a user input interface 92 that is coupled to bus 60, but may be connected by other interface and bus structures, such as a parallel port, game port, or a universal serial bus (USB).

An optional monitor 94 or other type of display device is also connected to bus 60 via an interface, such as a video adapter 96. In addition to the monitor, personal computers typically include other peripheral output devices (not shown), such as speakers and printers, which may be connected through output peripheral interface 98.

Computer 54 may operate in a networked environment using logical connections to one or more remote computers, such as a remote server/computer 100. Remote computer 10 may include many or all of the elements and features described herein relative to computer 54.

Logical connections shown in FIG. 4 are a local area network (LAN) 102 and a general wide area network (WAN) 104. Such networking environments are commonplace in offices, enterprise-wide computer networks, intranets, and the Internet. When used in a LAN networking environment, the computer 54 is connected to LAN 102 via network interface or adapter 106. When used in a WAN networking environment, the computer typically includes a modem 108 or other means for establishing communications over the WAN 104. The modem, which may be internal or external, may be connected to the system bus 60 via the user input interface 92 or other appropriate mechanism.

In a networked environment, program modules depicted relative to the personal computer 54, or portions thereof, may be stored in a remote memory storage device. By way of example, and not limitation, FIG. 4 illustrates remote application programs 110 as residing on a memory device of remote computer 100. It will be appreciated that the network connections shown and described are exemplary and other means of establishing a communications link between the computers may be used.

An implementation of an exemplary computer 54 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure, a federated management framework for credential data. While the disclosure has been particularly shown and described in conjunction with a preferred embodiment thereof, it will be appreciated that variations and modifications can be effected by a person of ordinary skill in the art without departing from the scope of the disclosure.

In another embodiment, this disclosure provides a business method that performs the process steps of the invention on a subscription, advertising, and/or fee basis. That is, a service provider, could offer to provide a framework within a computer system to manage credentials associated with a plurality of applications In this case, the service provider can create, deploy, maintain, support, etc., a federated management framework, such as framework 10 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, this disclosure provides a method for using a framework within a computer system to manage credentials associated with a plurality of applications. In this case, a federated data management framework, such as framework 10 (FIG. 1), can be provided and one or more systems for performing the process steps of the disclosure can be obtained and deployed to the framework. To this extent, the deployment of a system can comprise one or more of (1) installing program code on a computing device, such as a computer system, from a computer-readable medium; (2) adding one or more computing devices to the framework; and (3) incorporating and/or modifying one or more existing systems of the framework to enable the framework to perform the process steps of the invention.

What is claimed is:

1. A method for using a framework within a computer system to manage credentials associated with a plurality of applications, comprising:
receiving a request from one of the plurality of applications to modify a credential stored in a credential store that manages storing and sharing of the credentials, wherein the request to modify a credential does not initiate a change in the credential store until after a determination has been made with regard to acceptability of the modification proposed by the application making the request to modify the credential, wherein the modification of the credential includes one of any modification of the credential itself and a modification of labels or properties attached to the credential;
determining if the application making the request to modify the credential has declared rights to manage the credential;
aborting the modification of the credential with an error in response to determining that the application making the request to modify the credential has no declared rights to manage the credential;
determining which of the plurality of applications may have an interest in the credential if modified by the application making the request to modify the credential in response to determining that the application making the request to modify the credential has the declared rights to manage the credential, wherein an application has an interest in the modification of the credential if the application is affected by how the credential is managed and used;
notifying each of the interested plurality of applications of the request for modification of the credential; and
enabling each of the interested plurality of applications to issue a control action relating to the request for modification of the credential, wherein the control action is an action that comprises one of approving the request for modification, vetoing the request for modification, taking a recovery action and issuing a warning panel, and wherein the control action relating to the request for modification of the credential occurs subsequent to the request to modify the credential.

2. The method according to claim 1, further comprising obtaining registrations from each of the plurality of applications that indicate interest in a credential.

3. The method according to claim 2, further comprising maintaining a list of each of the plurality of applications and credentials registered by the applications.

4. The method according to claim 3, wherein the determining of which of the plurality of applications may have an interest in the credential if modified comprises querying the maintained list to find out which applications have registered an interest in the credential.

5. The method according to claim 1, further comprising forwarding approved modifications to the credential store.

6. A computer system that manages credentials associated with a plurality of applications, comprising:
at least one processing unit;
memory operably associated with the at least one processing unit; and
a federated data management framework storable in memory and executable by the at least one processing unit, the federated data management framework comprising:
an input component configured to receive a credential modification request from one of the plurality of applications to modify a credential stored in a credential store that manages storing and sharing of the credentials, wherein the request to modify a credential does not initiate a change in the credential store until after a determination has been made with regard to acceptability of the modification proposed by the application making the request to modify the credential, wherein the modification of the credential includes one of any modification of the credential itself and a modification of labels or properties attached to the credential;

a list containing each of the plurality of applications and the credentials that each application has an interest in, wherein an application has an interest in the modification of the credential if the application is affected by how the credential is managed and used; and a credential coordinator configured to receive the credential modification request and determine from the list if the application making the request to modify the credential has declared rights to manage the credential, the credential coordinator configured to abort the modification of the credential with an error in response to determining that the application making the request to modify the credential has no declared rights to manage the credential, the credential coordinator further configured, in response to determining that the application making the request to modify the credential has the declared rights to manage the credential, to determine which of the plurality of applications may have an interest in the credential if modified by the application making the request to modify the credential, wherein the credential coordinator comprises notification logic configured to notify each of the interested plurality of applications of the request for modification of the credential and enabling logic configured to permit each of the interested plurality of applications to issue a control action relating to the request for modification of the credential, wherein the control action is an action that comprises one of approving the request for modification, vetoing the request for modification, taking a recovery action and issuing a warning panel, and wherein the control action relating to the request for modification of the credential occurs subsequent to the request to modify the credential.

7. The computer system according to claim 6, wherein the input component comprises registration logic configured to permit each of the plurality of applications to register an interest in a credential.

8. The computer system according to claim 7, wherein the registration logic is further configured to supply registered credential information to the list.

9. The computer system according to claim 6, wherein the input component comprises credential access logic configured to permit each of the plurality of applications to propose credential modifications.

10. The computer system according to claim 6, wherein the credential coordinator further comprises query logic configured to query the list to find out which applications have an interest in the credential.

11. The computer system according to claim 6, wherein the credential coordinator further comprises logic configured to forward approved modifications to the credential store.

12. A non-transitory computer-readable medium storing computer instructions, which when executed, instructs a framework within a computer system to manage credentials associated with a plurality of applications, the computer instructions comprising:

receiving a request from one of the plurality of applications to modify a credential stored in a credential store that manages storing and sharing of the credentials, wherein the request to modify a credential does not initiate a change in the credential store until after a determination has been made with regard to acceptability of the modification proposed by the application making the request to modify the credential, wherein the modification of the credential includes one of any modification of the credential itself and a modification of labels or properties attached to the credential;

determining if the application making the request to modify the credential has declared rights to manage the credential;

aborting the modification of the credential with an error in response to determining that the application making the request to modify the credential has no declared rights to manage the credential;

determining which of the plurality of applications may have an interest in the credential if modified by the application making the request to modify the credential in response to determining that the application making the request to modify the credential has the declared rights to manage the credential, wherein an application has an interest in the modification of the credential if the application is affected by how the credential is managed and used;

notifying each of the interested plurality of applications of the request for modification of the credential; and enabling each of the interested plurality of applications to issue a control action relating to the request for modification of the credential, wherein the control action is an action that comprises one of approving the request for modification, vetoing the request for modification, taking a recovery action and issuing a warning panel, and wherein the control action relating to the request for modification of the credential occurs subsequent to the request to modify the credential.

13. The non-transitory computer-readable medium according to claim 12, further comprising instructions for obtaining registrations from each of the plurality of applications that indicate interest in a credential.

14. The non-transitory computer-readable medium according to claim 13, further comprising instructions for maintaining a list of each of the plurality of applications and credentials registered by the applications.

15. The non-transitory computer-readable medium according to claim 14, wherein the determining of which of the plurality of applications may have an interest in the credential if modified comprises instructions for querying the maintained list to find out which applications have registered an interest in the credential.

16. The non-transitory computer-readable medium according to claim 12, further comprising instructions for storing approved modifications in the credential store.

* * * * *